1,635,880

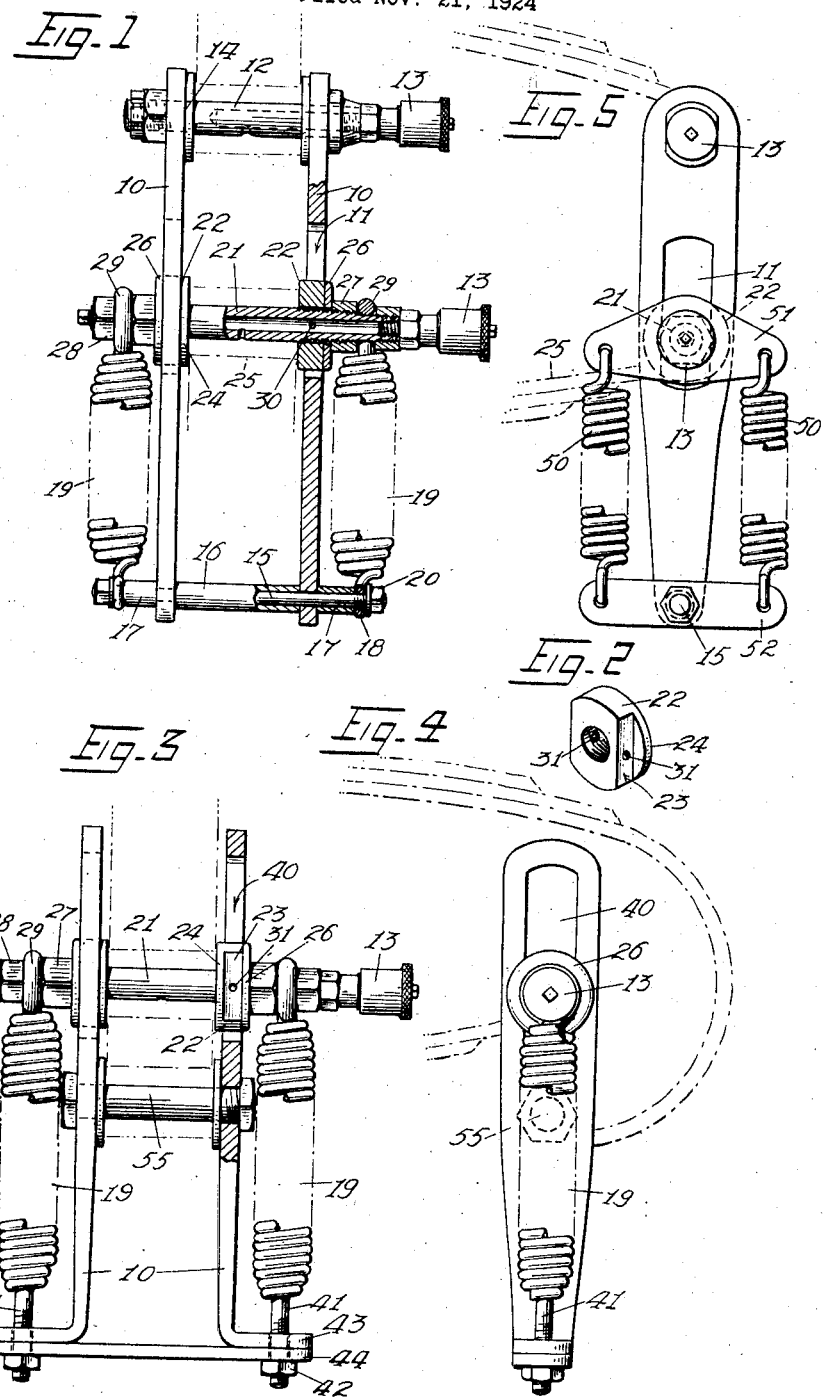
July 12, 1927.
F. D. ARMSTRONG
SHOCK ABSORBER SHACKLE
Filed Nov. 21, 1924
1,635,880
INVENTOR:
Fredrick Donald Armstrong
BY: Francis E. Boyer
ATTORNEY Patented July 12, 1927.

UNITED STATES PATENT OFFICE.

FREDRICK DONALD ARMSTRONG, OF WEST KOGARAH, NEAR SYDNEY, NEW SOUTH WALES, AUSTRALIA.

SHOCK-ABSORBER SHACKLE.

Application filed November 21, 1924, Serial No. 751,341, and in Australia December 27, 1923.

This invention relates to suspension spring shackles for motor road vehicles.

Relief spring shackles are already known and in use in which helical springs are interposed in the shackle connections between the eyes of leaf springs, or between the shackle end of a leaf spring and the end of a chassis frame overlying said spring. No claim is therefore made broadly in respect of the interposition of springs having low damping characteristics in the leaf suspension system of a vehicle.

The present invention is restricted to an improved structural form of spring relief shackle in which an assembly of two or four helical springs is used with the springs disposed in tension and carried in a shackle frame as hereafter described in detail. The shackle frame is characterized in that the spring tails are anchored to offset bent ends of the shackle jaws or to the overhung ends of spacing bolts which are passed through the shackle jaws, whilst the pull ends of the springs are carried on a floating shackle pin which is fitted with washered slide jaws which are arranged to move slidably in slots in the shackle jaws. A fixed shackle bolt passes through the shackle jaws and through one of the connected members of the leaf spring and chassis assembly. The shackle construction admits of reversal in the arrangement of its members so that it may be utilized in the case of suspension shackles or compression shackles and in either case with either two or four springs in each shackle.

In the accompanying drawings:—

Fig. 1 is an end elevational view of a compression shackle according to the present invention with the spring tails hung on the overhung ends of a through bolt at the foot of the shackle, portion of the structure being shown in section to better illustrate the detail;

Fig. 2 is a perspective view of one of the washered slides which works in slots in the shackle jaws;

Fig. 3 is an elevational view of a tension type shackle showing also a portion of the structure in section and the spring tails anchored down to offset bent ends of the shackle jaws through a spreader plate which connects those ends;

Fig. 4 is a side elevational view showing the method of fitting a tension shackle which has one pair of springs in its structure; and Fig. 5 is a side elevational view illustrating the method of fitting a compression shackle having two pairs of springs.

In Fig. 1, 10—10 are the shackle jaws. They consist of rectangular section metal bars slotted as shown at 11, fitted with a fixed shackle bolt 12 which is provided with a greaser cap or equivalent contrivance 13, and is also fitted with spacing washers 14. 15 is a through spacing and suspension bolt at the foot of the shackle jaws 10, the spacing thimble 16 interposed between the shackle jaws, and spacing thimbles 17 between the shackle jaws and the tails 18 of the shackle springs 19. 20 are nuts on the ends of the bolt 15. The heads of the springs 19 are carried on the overhung portions of the sliding shackle bolt 21. This bolt, like the bolt 12, is tubular and is also fitted with a greaser or equivalent contrivance 13. 22 are washer slides which are fitted on the bolt 21; their guide faces 23 are fitted to the sides of the slots 11 and their lenticular flange (washer) portions 24 overlie the sides of the slots 11 and form bearing faces for the ends of the leaf eye of a suspension spring 25. 26 are cover washers which set up against the outer cheeks of the washer slides 22 and embrace the outer sides of the shackle jaws 10. 27 and 28 are nuts between which the hanger eyes 29 of the springs 19 are carried on the bolt 21. 30 is a through grease hole in the bolt 21 aligning with the through grease hole 31 in each of the washer slides 22. Grease passes from the tubular cavity in the bolt 21 through the holes 30 and 31 to lubricate the slide faces of the shackle jaw slots 11.

The shackle is set up appropriately to the width of the spring leaf by adjustment of the length of bolts 12, 15, and 21 by means of the nuts on same. In practice only sufficient freedom for adjustment is provided for as is found necessary in practice to allow for inexactness and wear on the ends of the shackle eyes and leaf springs of certain width. It is more desirable to interchange the bolts 12, 15 and 21 to adapt a shackle to suit another width of leaf spring rather than to close up the nuts on a shackle of excess width to set it for leaf springs of lesser width.

It will be observed that the bolt 12 being fixed and the bolt 21 being slidably relatively to it under tension of the springs 19, the shackle can function only as a compression shackle in the arrangement indicated in Fig. 1. When, however, it is desired to use the fitting in tension arrangement, as indicated in Figs. 3 and 4, the lower bolt 55 is the fixed bolt and the upper bolt 21 is slidably carried in the slots 40 in the shackle jaws 10, the slots in this case being disposed near the top of the shackle jaws, and not intermediate the length of the shackle jaws, as shown at 11 in Fig. 1. In the Fig. 3 arrangement the greaser 13 must be omitted from the end of the fixed shackle bolt. The spring tail rods 41 are in this case secured by nuts 42 said tail rods being passed through the outbent bottom ends 43 of the shackle jaws 10 and through a spacer bar 44 set below it to fix the spacing of the shackle jaws. The spring tail rods 41 are secured by nuts 42, said tail rods being passed through the outbent bottom ends 43 of the shackle jaws 10, and through a spacer bar 44 set below it to fix the spacing of the shackle jaws. In all cases the dimensions of the springs used should be such that they flex easily under normal load and have sufficient working range—which is limited by the slot length—to accommodate the difference in movement of wheels and chassis when the vehicle is being driven over an average rough road.

In the quadruple spring arrangement which is adaptable to the Fig. 1 or Fig. 3 types of construction, two springs are used on either side of the shackle instead of one spring only as indicated in Figs. 1 and 3. These springs marked 50 in Fig. 5 are respectively hung up at their top ends to yokes 51 which are carried on the bolts 21, and their tails are hung up to swingle bars 52 which are held on the bolts 15. A more compact arrangement is offered in the Fig. 5 type of construction than in the Fig. 1 and Fig. 3 types. The swingle bars may be keyed to the bolts 15, or they may be carried free on them so that they may oscillate obediently to differential movement of the springs 50.

What I claim as my invention and desire to secure by Letters Patent is:—

1. A relief shackle for leaf springs characterized in that the shackle is constituted of a pair of rectangular section slotted bars spaced apart by a fixed foot member and a fixed shackle bolt and which carry a movable shackle bolt which extends through the slots in the bars, said movable shackle bolt suspended from the shackle foot bolt by helical springs in tension and fitted with washered slide blocks operatively disposed in said slots, said blocks having through holes therethrough from a grease cell in the shackle bolt to the working faces, said holes adapted for distributing lubricant on said faces in the movement of said blocks in the shackle bar slots.

2. A relief shackle for leaf springs comprising a pair of slotted bars connected and spaced apart by a fixed foot member and by a fixed shackle bolt, a movable shackle bolt extending through and slidable in slots in said bars, a yoke centered on each end of said movable bolt, a swingle bar centered on each end of said fixed foot member and a pair of suspension springs hung on each side of the shackle on the ends of said yokes and of said swingle bars.

In testimony whereof I affix my signature.

FREDRICK DONALD ARMSTRONG.